US006400267B1

(12) United States Patent
Gordon-Levitt et al.

(10) Patent No.: US 6,400,267 B1
(45) Date of Patent: Jun. 4, 2002

(54) WIRELESS REED SWITCH-BASED BURGLAR ALARM

(75) Inventors: Daniel D. Gordon-Levitt, Sherman Oaks; Douglas Carner, Van Nuys, both of CA (US)

(73) Assignee: Calstar Systems Group, Inc., Sherman Oaks, CA (US)

( * ) Notice: Subject to any disclaimer, the term of this patent is extended or adjusted under 35 U.S.C. 154(b) by 0 days.

(21) Appl. No.: 09/888,012

(22) Filed: Jun. 22, 2001

Related U.S. Application Data
(60) Provisional application No. 60/259,932, filed on Jan. 5, 2001.

(51) Int. Cl.$^7$ .............................................. G05B 13/08
(52) U.S. Cl. ................. 340/547; 340/545.6; 340/545.7; 335/205; 335/207
(58) Field of Search .............................. 340/547, 545.6, 340/545.8, 551, 545.7; 200/61.41, 61.76, 81.9, 61.71; 335/205, 207

(56) References Cited

U.S. PATENT DOCUMENTS

| | | | | |
|---|---|---|---|---|
| 3,849,614 A | * | 11/1974 | Connery ................... | 200/61.41 |
| 4,027,278 A | * | 5/1977 | Giannini ..................... | 335/154 |
| 4,213,110 A | * | 7/1980 | Holce ......................... | 335/207 |
| 4,292,629 A | * | 9/1981 | Kerr et al. .................. | 340/547 |
| 4,331,945 A | * | 5/1982 | Cattani, II .................. | 335/205 |
| 5,233,323 A | * | 8/1993 | Burkett et al. .............. | 335/205 |
| 5,530,428 A | * | 6/1996 | Woods ........................ | 340/547 |
| 5,723,835 A | * | 3/1998 | Gilmore ................... | 200/61.71 |
| 5,977,873 A | * | 11/1999 | Woods ........................ | 340/547 |
| 6,310,548 B1 | * | 10/2001 | Stephens et al. ............ | 340/540 |

\* cited by examiner

*Primary Examiner*—Daniel J. Wu
*Assistant Examiner*—Phung Nguyen
(74) *Attorney, Agent, or Firm*—Koppel, Jacobs, Patrick & Heybl

(57) ABSTRACT

A reed switch-based burglar alarm features two reed switches mounted perpendicularly to each other within the alarm enclosure. The orientations of the perpendicular reed switches permit the enclosure to be mounted in alternate ways with respect to a movable structure being monitored. The first reed switch lies in a plane parallel to the surface to which the alarm is mounted, and the second reed switch lies in a plane perpendicular to the mounting surface. Thus, a magnet can be mounted on a swing-out type door and the enclosure mounted on a wall adjacent to the door such that the magnet actuates the first reed switch when the door is closed. Similarly, a magnet can be mounted on a roll-up type door and the enclosure mounted to a surface perpendicular to the door such that the magnet actuates the second reed switch when the door is closed. The alarm preferably includes features which enable it to be mounted on the outside of the space being protected. An anti-tamper reed switch can be employed to detect the presence of a rogue magnet, and another anti-tamper switch can be used to indicate that the cover of the enclosure has been removed. The preferred alarm communicates wirelessly, and is housed in an impact and weather resistant enclosure.

17 Claims, 6 Drawing Sheets

WIRELESS REED SWITCH-BASED BURGLAR ALARM

This application claims the benefit of provisional patent application No. 60/259,932 to Gordon-Levitt et al., filed Jan. 5, 2001.

BACKGROUND OF THE INVENTION

1. Field of the Invention

This invention relates to the field of burglar alarms, and particularly to wireless reed switch-based burglar alarms.

2. Description of the Related Art

Reed switch-based burglar alarms are well-known and widely used. Conventionally, such alarms are mounted adjacent to a movable structure such as a door or window. The movable structure provides access to a space to be protected, such as a home, a business, or a warehouse. The burglar alarm is housed within an enclosure which includes a magnetic reed switch—i.e., a long, thin switch which is actuated by means of a magnet brought near and oriented along the length of the switch. An actuating magnet is mounted to the movable structure and oriented such that, when closed (thereby blocking access to the protected space), the reed switch is actuated, and when opened, the reed switch is de-actuated. Circuitry monitors the switch's actuation state to detect an unauthorized entry attempt.

An unauthorized entry attempt may be signaled in any of several ways. For example, an audible and/or visible indicator may be built into the alarm unit. Alternatively, the monitoring circuitry may generate a signal which is conveyed to a remote receiver which receives the signal and provides an alarm indication.

A burglar alarm of this sort is typically mounted on the inside of the protected space; this is done to prevent tampering, and to protect the alarm from the elements. However, this approach can have a number of drawbacks in applications in which access to the inside of the protected space is not readily available. For example, a renter of a mini-storage unit may wish to protect his goods with a burglar alarm, but does not wish to grant regular access to the inside of his space. In such a situation, necessary or routine maintenance or repair of the alarm unit may be impossible, which can result in unauthorized entry into the space with no alarm indication.

SUMMARY OF THE INVENTION

A reed switch-based burglar alarm is presented which overcomes the problems noted above. The alarm provides several mounting options, including that of mounting on the outside of the space being protected.

The novel burglar alarm features two reed switches mounted perpendicularly to each other within the alarm enclosure. The orientations of the perpendicular reed switches permit the enclosure to be mounted in alternate ways with respect to the movable structure being monitored. The alarm is preferably housed within a parallelepiped enclosure, with one of the enclosure's sides adapted for mounting to a surface. The first reed switch lies in a plane parallel to the surface to which the alarm is mounted, and the second reed switch lies in a plane perpendicular to the mounting surface. Thus, a magnet can be mounted on a swing-out type door and the alarm enclosure mounted on a wall adjacent to the door such that the magnet actuates the first reed switch when the door is closed. Similarly, a magnet can be mounted on a roll-up type door and the enclosure mounted to a surface perpendicular to the door (such as the door jamb) such that the magnet actuates the second reed switch when the door is closed. This arrangement provides the present alarm an unprecedented level of mounting flexibility.

Several features are described which facilitate using the present alarm on the outside of the protected space. The alarm's enclosure is preferably made impact and weather-resistant. The present alarm is preferably made wireless, to eliminate the presence of hard-wiring which can become damaged. An anti-tamper reed switch can be used to detect the presence of a rogue magnet intended to keep the alarm from sounding when the movable structure is being moved. Another anti-tamper reed switch can be used to indicate that the cover of the enclosure has been removed.

Further features and advantages of the invention will be apparent to those skilled in the art from the following detailed description, taken together with the accompanying drawings.

BRIEF DESCRIPTION OF THE DRAWINGS

FIG. 1b is a cross-sectional view corresponding to the plan view of FIG. 1a.

FIG. 2b is a plan view of the burglar alarm and door of FIG. 2a.

FIG. 3b is a plan view of the burglar alarm and door of FIG. 3a.

FIG. 4b is a cross-sectional view corresponding to the plan view of FIG. 4a.

FIG. 5b is a cross-sectional view corresponding to the plan view of FIG. 5a.

DETAILED DESCRIPTION OF THE INVENTION

Figure 1A:
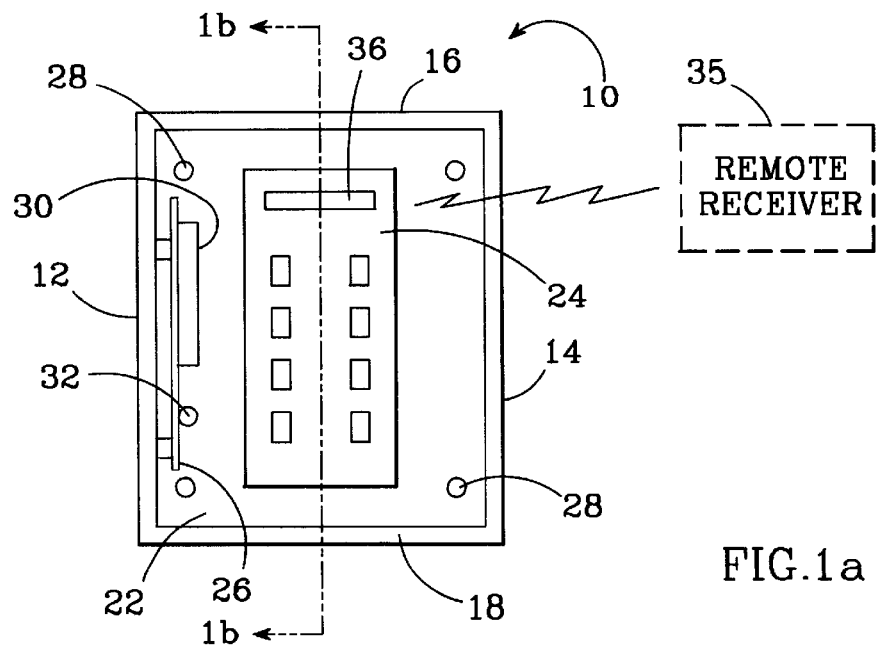
FIG. 1a is a plan view of a burglar alarm per the present invention.

The basic principles of a reed switch-based burglar alarm in accordance with the present invention are illustrated in FIGS. 1a (plan view) and 1b (corresponding cross-sectional view). The present alarm is housed within an enclosure 10. The enclosure is preferably a parallelepiped, with a parallel left and right sides 12 and 14 oriented perpendicularly to parallel front and back sides 16 and 18, all sandwiched between parallel top and bottom sides 20 and 22, respectively. For clarity, top side 20 is not shown in FIG. 1a. Top side 20 preferably includes a means of attaching it to the rest of enclosure 10, such as holes 21 into which attachment screws (not shown) can be inserted and screwed into corresponding holes 22 extending from the sides of the enclosure. In this exemplary embodiment, the alarm circuitry is located on a first circuit board 24 mounted to the bottom side 22 of the enclosure, and a second circuit board 26 mounted to one of the sides (12) of the enclosure. The bottom side 22 of the enclosure is adapted for mounting to a mounting surface by including, for example, mounting holes 28 into which mounting screws can be inserted.

The alarm circuitry includes two reed switches 30 and 32 mounted to circuit board 26. Note that, though reed switches 30 and 32 are shown mounted on the side of circuit board 26 facing the interior of enclosure 10, they may also be mounted on the opposite side of board 26. Each reed switch is actuated when a magnet is placed in close proximity to and oriented along the length of the switch. The reed switches have two states: when properly aligned with a nearby magnet, the reed switch is "actuated"; otherwise, the switch is "de-actuated". The switches are connected to the other alarm circuitry, which monitors their respective actuation states.

Figure 1B:
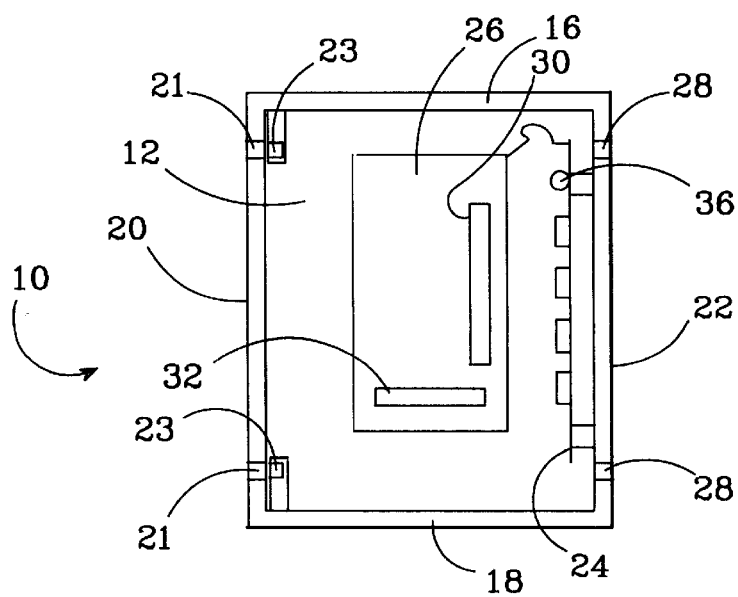
Figure 1C:
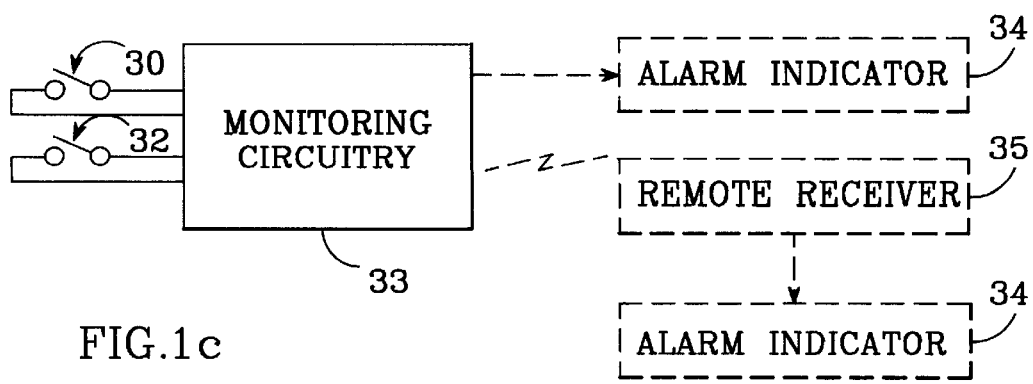
FIG. 1c is a block diagram illustrating several possible operating modes for the present alarm.

A block diagram illustrating the operation of the alarm is shown in FIG. 1c. When the actuation state monitoring circuitry 33 detects that the actuation states of one of the switches has changed, it generates a signal which indicates this. This signal may be used in at least one of several ways: for example, it may be used to trigger a visible and/or audible alarm indicator 34 mounted within or near the alarm enclosure, or may be hard-wired or broadcasted to such an indicator mounted some distance from the enclosure. The preferred method of handling the alarm signal is to convey it wirelessly to a remote receiver 35, via an antenna 36 mounted within enclosure 10. Circuitry capable of monitoring the actuation states of the switches and conveying them to an alarm indicator are well-known to those acquainted with the field.

Figure 2A:
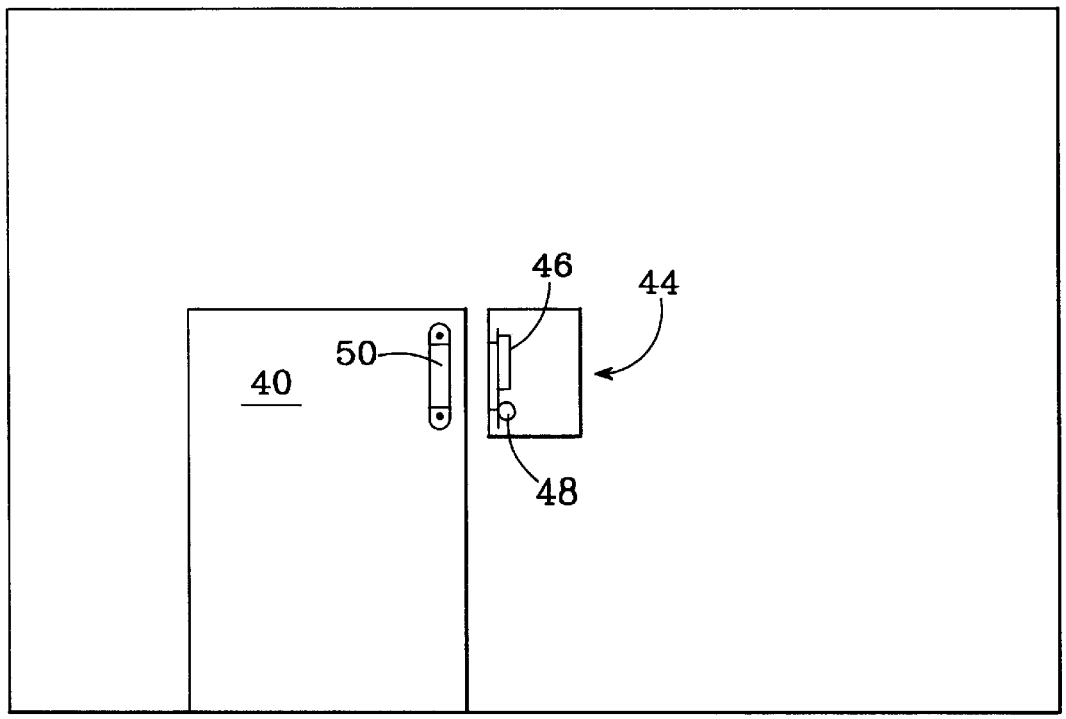
FIG. 2a is a front elevation view of a burglar alarm per the present invention as it might be used to detect the motion of a swing-out door.
Figure 2B:
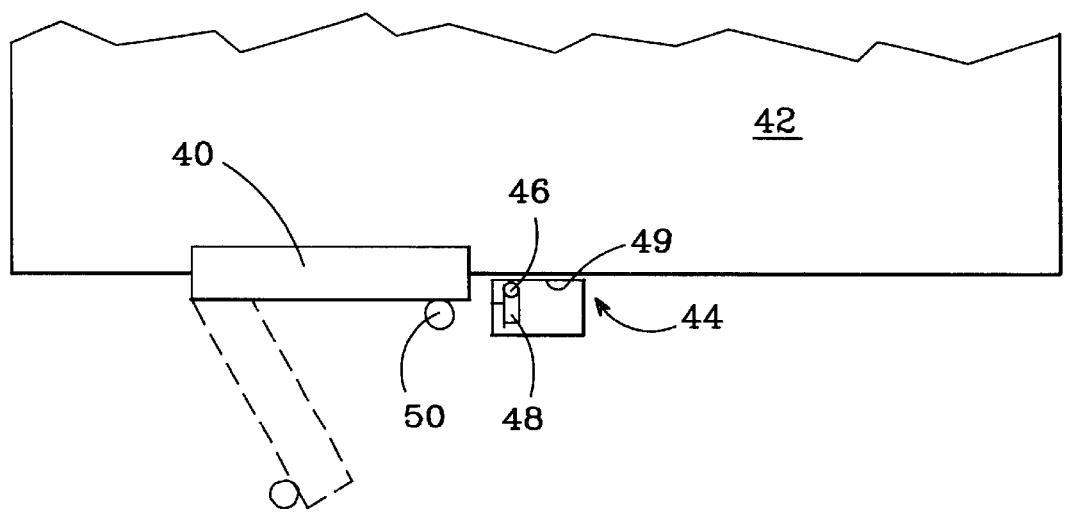

In accordance with the present invention, reed switches 30 and 32 are mounted in a specific relationship to each other: reed switch 30 is mounted such that it lies in a first plane parallel to the bottom side 22 of the enclosure, and second reed switch 32 is mounted such that it lies in a plane perpendicular to the first plane. Positioning the two reed switches such that they lie in perpendicular planes increases the burglar alarm's mounting options. This is illustrated in FIGS. 2a, 2b, 3a and 3b. In FIGS. 2a (front elevation view) and 2b (plan view), a swing-out type door 40 provides access to a space 42, such as a home, business, warehouse or ministorage unit. A burglar alarm 44 per the present invention is mounted adjacent to door 40. For clarity, the top and front sides of the alarm enclosure are removed in FIGS. 2a and 2b, respectively. As noted above, alarm 44 includes one reed switch 46 mounted such that it lies in a first plane parallel to the alarm enclosure's bottom surface 49, and one reed switch 48 mounted such that it lies in a second plane perpendicular to the first plane. The alarm also includes monitoring circuitry (not shown) which detects changes in the actuation states of the reed switches.

The bottom surface 49 of alarm 44 is mounted to the wall surrounding door 40, such that reed switch 46 lies is a plane parallel to the plane of the wall. A magnet 50 is mounted on door 40 such that it lies in a plane parallel to the first plane and to the wall, and such that it actuates reed switch 46 when the door is closed. When door 40 is opened, magnet 50 moves away from reed switch 46, which becomes de-actuated. The monitoring circuitry detects this and generates a signal which indicates the change of state.

Figure 3A:
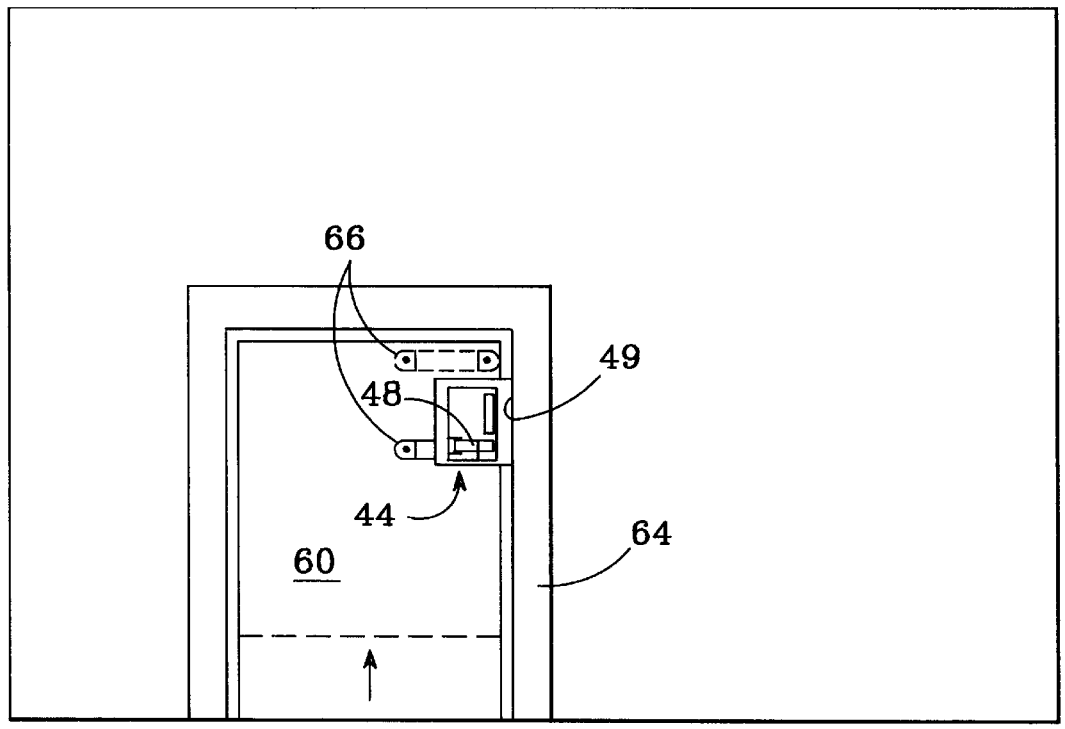
FIG. 3a is a front elevation view of a burglar alarm per the present invention as it might be used to detect the motion of a roll-up door.
Figure 3B:
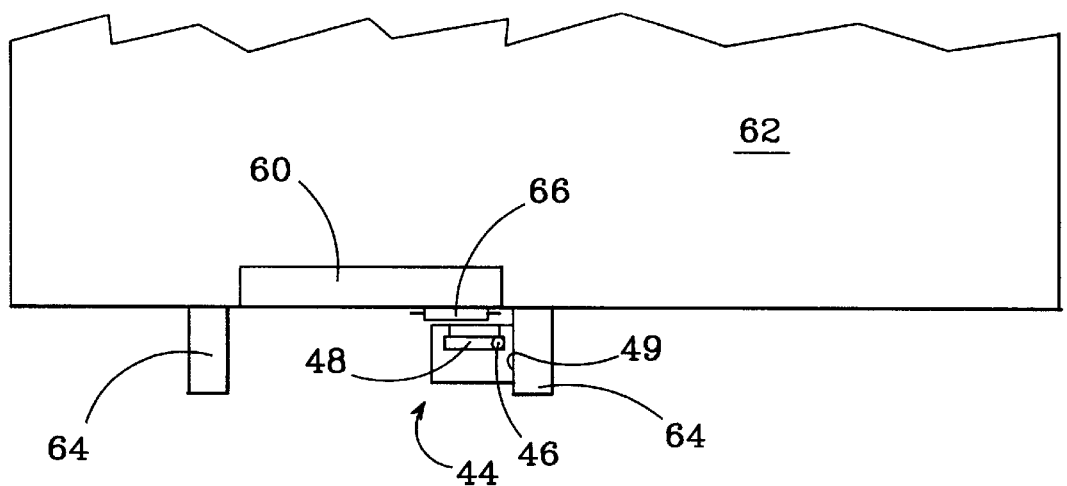

Another mounting arrangement made possible by the novel burglar alarm is shown in FIGS. 3a (front elevation view) and 3b (plan view). Here, a roll-up type door 60 provides access to a space 62. Burglar alarm 44 is mounted adjacent to door 60. For clarity, the right and front sides of the alarm enclosure are removed in FIGS. 3a and 3b, respectively. As described above, alarm 44 includes one reed switch 46 mounted such that it lies in a first plane parallel to the alarm enclosure's bottom surface 49, and one reed switch 48 mounted such that it lies in a second plane perpendicular to the first plane.

The alarm's bottom (mounting) surface 49 is mounted to a surface which lies in a plane perpendicular to the plane of the door; in this case, the alarm is mounted to a side of a door jamb 64 (top member of door jamb 64 not shown for clarity). A magnet 66 is mounted to door 60 such that it lies in the plane of the door (thus perpendicular to the bottom surface 49 of alarm 44), and is positioned such that it actuates reed switch 48 when the roll-up door is closed. Magnet 66 is shown in two positions in FIG. 3a: with door 60 closed, and with door 60 partially open. When door 60 is opened, magnet 66 moves away from reed switch 48, which becomes deactuated. The monitoring circuitry detects this and generates a signal which indicates the change of state.

A conventional alarm has one or two reed switches mounted parallel to the mounting plane, and would be unable to accommodate the different mounting arrangements shown in FIGS. 2 and 3. The present alarm overcomes this shortcoming by including perpendicular reed switches, which enables the alarm to be mounted in a plane parallel to the movable structure being monitored, or in a plane perpendicular to the movable structure. In this way, a single alarm unit can be employed in multiple mounting situations without modification or retrofitting.

Figure 4A:
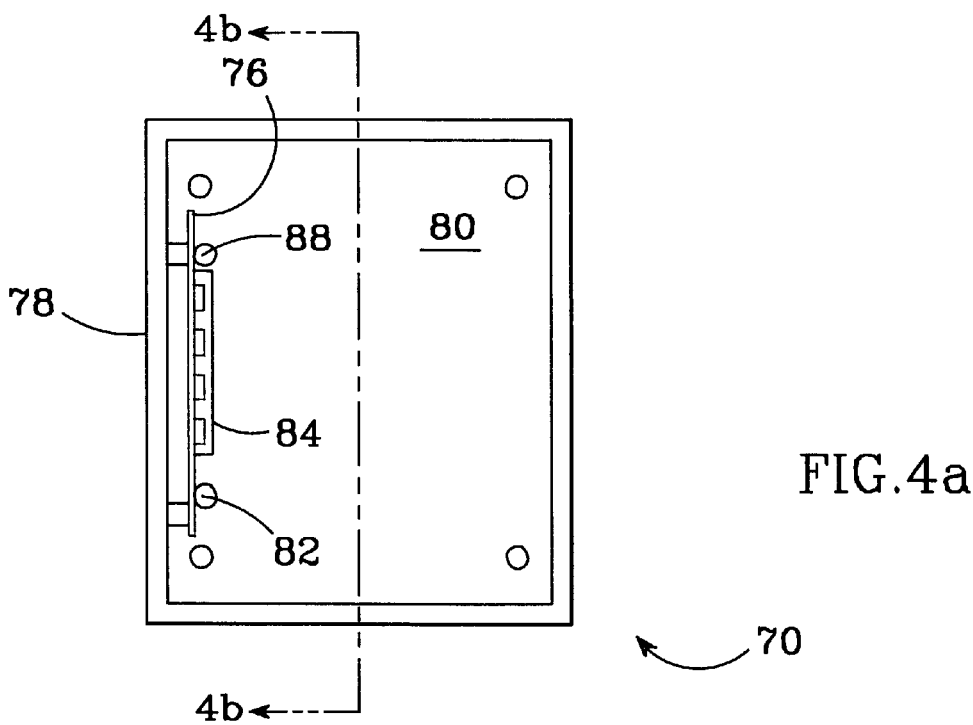
FIG. 4a is a plan view of a burglar alarm per the present invention in which the circuitry resides on a single side-mounted circuit board.
Figure 4B:
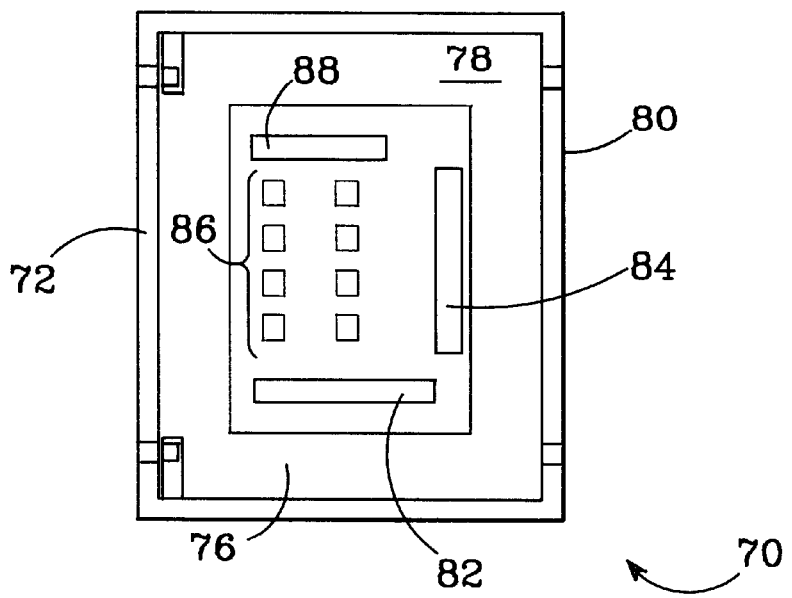

To achieve the necessary relationship between the perpendicular reed switches, it is necessary that the switches be mounted on a circuit board which lies in a plane which is perpendicular to the plane of the enclosure's bottom side—as is board 26 in FIGS. 1a and 1b. The remaining burglar circuitry may be accommodated in several ways. One way is as shown in FIGS. 1a and 1b, with the remaining circuitry placed on another circuit board 24. An alternative arrangement of a burglar alarm 70 is depicted in FIGS. 4a (plan view) and 4b (corresponding cross-sectional view); for clarity, the enclosure's top side 72 is not shown in FIG. 4a. Here, all of the burglar alarm circuitry is placed on a single board 76 mounted to one of the sides 78 which is perpendicular to the bottom (mounting) side 80 of the enclosure. Board 76 includes the alarm's two reed switches 82 and 84, monitoring circuitry 86, and, if needed, circuitry and an antenna 88 for facilitating the wireless broadcast of an output signal. This approach requires the fabrication and installation of just a single circuit board, though it may be difficult to place all of the necessary components on a single board in this fashion.

Figure 5A:
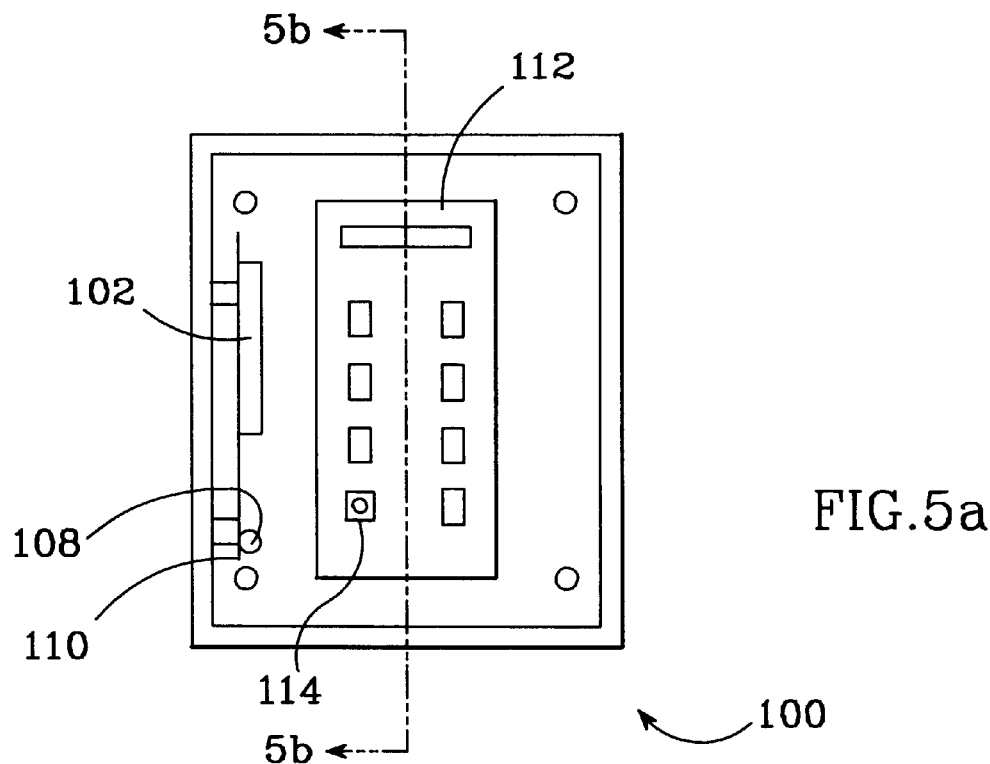
FIG. 5a is a plan view of a burglar alarm per the present invention which employs first and second anti-tamper switches.
Figure 5B:
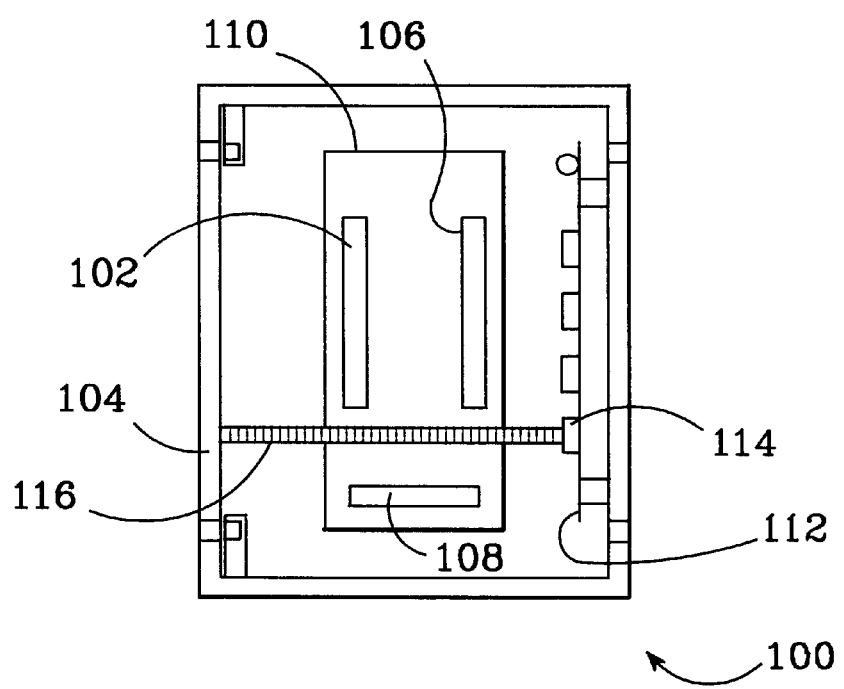

In addition to facilitating multiple mounting arrangements, the present burglar alarm is preferably arranged for mounting on the outside of the space to be protected. When access to the protected space is generally restricted, as with mini-storage units, for example, mounting the alarm on the outside makes installation, routine maintenance, and repair tasks considerably easier. However, it also makes the alarm vulnerable to tampering and the weather. To counter this, the alarm preferably includes at least one anti-tamper switch. A burglar alarm 100 which includes one such possible anti-tamper switch—a reed switch 102, is depicted in FIGS. 5a (plan view) and 5b (corresponding cross-sectional view); for clarity, top side 104 is not shown in FIG. 5a. The alarm also includes the two perpendicular reed switches 106 and 108 described above, mounted on a board 110; a second board 112 may be used to hold additional alarm electronics. In the configuration depicted, one of reed switches 106 or 108 is actuated with a corresponding magnet mounted on the door or window being monitored; the alarm is triggered when the actuated switch is de-actuated due to the movement of the magnet and monitored structure. A would-be intruder may attempt to use a rogue magnet to keep the switch actuated and the alarm off as he opens the monitored structure. Anti-tamper switch 102 is used to detect the presence of such a rogue magnet. As the rogue magnet is brought close to reed switches 106 and 108, it actuates anti-tamper switch 102. The alarm's monitoring circuitry is arranged to detect the actuation of switch 102 and to trigger the alarm when so detected.

Another anti-tamper switch 114 may be employed to detect an attempt to tamper with the alarm by removing the top side 104 of the enclosure. The switch 114 is mounted on board 112, and includes a means of sensing when the top side 104 of the alarm enclosure is removed. A spring 116 which is compressed when the top side is in place may be used to actuate and de-actuate switch 114. The alarm's monitoring circuitry is arranged to detect the de-actuation of switch 114 and to trigger the alarm when so detected.

When mounted outside of the space being protected, the alarm enclosure is preferably made weather and impact resistant. A preferred embodiment of the present alarm includes both the anti-tamper switches described above, with the alarm circuitry housed in an impact and weather-resistant enclosure and arranged to communicate switch status wirelessly.

Figure 6:
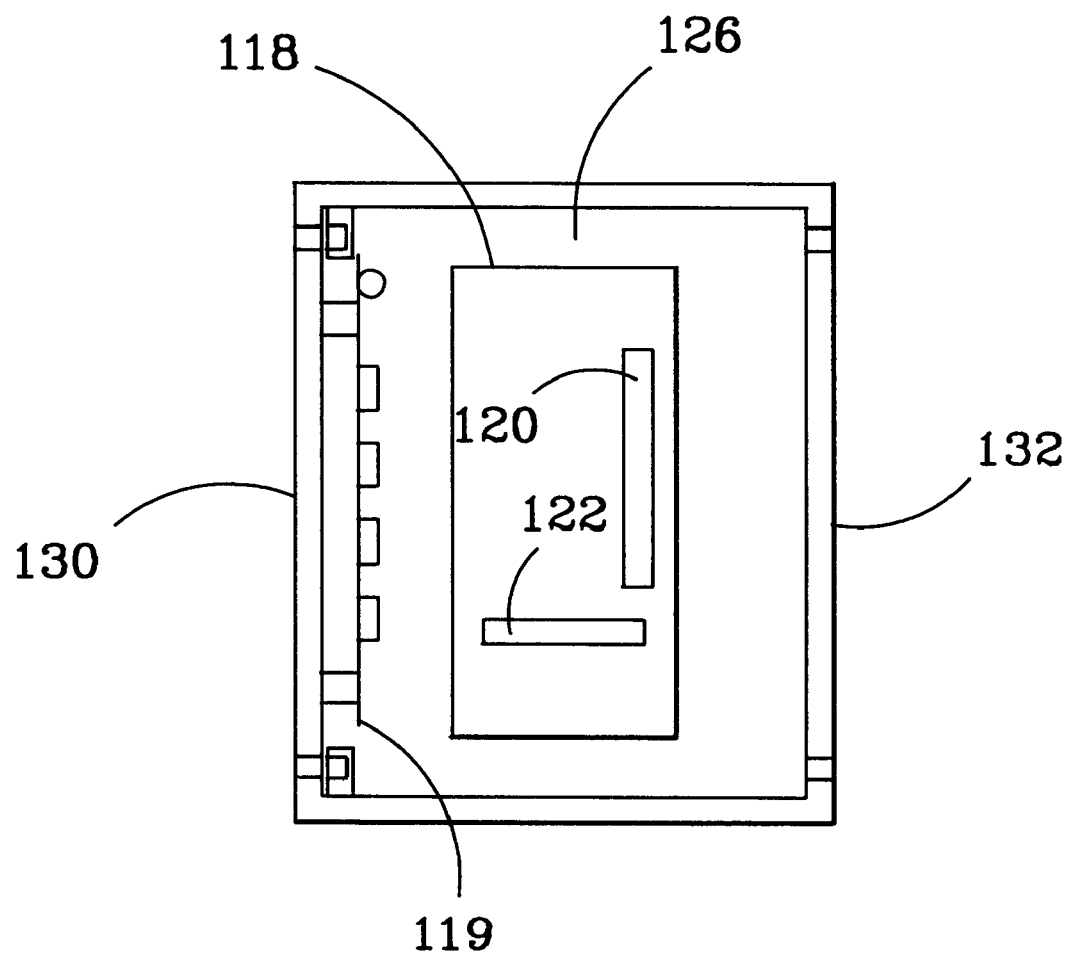
FIG. 6 is a sectional view of an alternative embodiment of a burglar alarm per the present invention.

Another possible alarm configuration is shown in FIG. 6 (sectional view). As before, the enclosure includes first and second circuit boards 118 and 119, with first and second reed switches 120 and 122 attached to board 118 mounted on one of the alarm enclosure's sides 126. Here, however, the second circuit board 119 is mounted to the top side 130 of the enclosure, instead of to the bottom, mounting surface side 132. This arrangement simplifies the installation of the alarm, as second circuit board 119 no longer restricts access to the bottom, mounting surface side 132 of the enclosure.

While particular embodiments of the invention have been shown and described, numerous variations and alternate embodiments will occur to those skilled in the art. Accordingly, it is intended that the invention be limited only in terms of the appended claims.

We claim:

1. A reed switch-based burglar alarm, comprising:
   a parallelepiped enclosure having top and bottom sides separated with front, back, left and right sides which are perpendicular to said top and bottom sides, said bottom side adapted for mounting to a mounting surface, said enclosure containing burglar alarm circuitry comprising:
      a first reed switch which lies in a first plane parallel to the plane of said bottom side such that said first reed switch is actuated by a magnet which lies in a plane parallel to said first plane,
      a second reed switch which lies in a second plane perpendicular to said first plane such that said second reed switch is actuated by a magnet which lies in a plane parallel to said second plane, and
      monitoring circuitry arranged to monitor the actuation states of said reed switches and to produce an output signal which indicates when the actuation state of one of said reed switches changes, and
   a magnet mounted to a movable structure adjacent to said alarm enclosure,
   said first and second reed switches and said magnet arranged such that when said movable structure is a swing-out door and said enclosure's bottom side is mounted to a surface which lies in a plane parallel to the plane in which said swing out door lies when closed, said magnet actuates said first reed switch when said door is closed, and
   such that when said movable structure is a roll-up door and said enclosure's bottom side is mounted to a surface which lies in a plane perpendicular to the plane in which said roll-up door lies when closed, said magnet actuates said second reed switch when said door is closed.

2. The burglar alarm of claim 1, wherein said monitoring circuitry is arranged to wirelessly broadcast said output signal to a remote receiver.

3. The burglar alarm of claim 1, wherein said circuit board is mounted to one of said front, back, left and right sides.

4. The burglar alarm of claim 3, further comprising a second circuit board mounted to one of said top and bottom sides which contains at least a portion of said burglar alarm circuitry.

5. The burglar alarm of claim 3, wherein said circuit board mounted to one of said front, back, left and right sides contains all of said burglar alarm circuitry.

6. The burglar alarm of claim 1, further comprising an anti-tamper reed switch positioned such that it may be actuated by a rogue magnet brought near said enclosure, said monitoring circuitry arranged to produce an output signal which indicates when said anti-tamper reed switch has been actuated.

7. The burglar alarm of claim 1, wherein said enclosure includes a removable lid which provides access to said burglar alarm circuitry, said burglar alarm further comprising an anti-tamper switch arranged such that its actuation state changes when said lid is removed from said enclosure, said monitoring circuitry arranged to produce an output signal which indicates when said anti-tamper switch's actuation state has changed.

8. The burglar alarm of claim 1, wherein said enclosure is weather-resistant.

9. A wireless, reed switch-based burglar alarm suitable for use on the outside of an area being protected by said alarm, comprising:
   a movable structure having open and closed states which blocks access to a protected area when closed, said movable structure lying in a first plane when closed,
   an enclosure having a bottom side mounted to a mounting surface on the outside of said protected area, said enclosure containing burglar alarm circuitry comprising:
      a first reed switch oriented in a second plane parallel to the plane of said bottom side such that said first reed switch is actuated by a magnet which lies in a plane parallel to said second plane,
      a second reed switch oriented in a third plane perpendicular to said second plane such that said second reed switch is actuated by a magnet which lies in a plane parallel to said third plane,
      an anti-tamper reed switch positioned such that it may be actuated by a rogue magnet brought near said enclosure,
      monitoring circuitry arranged to monitor the actuation states of said reed switches and to produce an output signal which indicates when the actuation state of one of said first and second reed switches changes and an output signal which indicates when said anti-tamper reed switch has been actuated, and broadcasting circuitry arranged to wirelessly broadcast said output signals to a remote receiver, and a magnet mounted on said movable structure, said first and second reed switches and said magnet arranged such that when said movable structure is a swing-out door and said enclosure's bottom side is mounted to a surface which lies in a plane parallel to the plane in which said swing out door lies when closed, said magnet actuates said first reed switch when said door is closed, and such that when said movable structure is a roll-up door and said enclosure's bottom side is mounted to a surface which lies in a plane perpendicular to the plane in which said roll-up door lies when closed, said magnet actuates said second reed switch when said door is closed.

10. The burglar alarm of claim 9, wherein said enclosure includes a removable lid which provides access to said burglar alarm circuitry, said burglar alarm further comprising a second anti-tamper switch arranged such that its actuation state changes when said lid is removed from said enclosure, said monitoring circuitry arranged to produce an output signal which indicates when said second anti-tamper switch's actuation state has changed.

11. The burglar alarm of claim 10, wherein said anti-tamper switch includes a spring which is compressed and actuates said anti-tamper switch when said lid is attached to said enclosure and which is de-compressed and de-actuates said anti-tamper switches when said lid is removed.

12. The burglar alarm of claim 9, wherein said enclosure is weather-resistant.

13. The burglar alarm of claim 9, wherein said enclosure comprises a parallelepiped having top and bottom sides separated with front, back, left and right sides which are perpendicular to said top and bottom sides, said bottom side adapted for mounting to a mounting surface, said first and second reed switches attached to a circuit board mounted such that said first reed switch lies in a plane parallel to said bottom side and said second reed switch lies in a plane perpendicular to said bottom side.

14. The burglar alarm of claim 13, wherein said circuit board is mounted to one of said front, back, left and right sides.

15. The burglar alarm of claim 14, further comprising a second circuit board mounted to said bottom side which contains at least a portion of said burglar alarm circuitry.

16. The burglar alarm of claim 14, wherein said circuit board mounted to one of said front, back, left and right sides contains all of said burglar alarm circuitry.

17. The burglar alarm of claim 14, further comprising a second circuit board mounted to said top side which contains at least a portion of said burglar alarm circuitry.

\* \* \* \* \*